United States Patent
Motzki et al.

(10) Patent No.: US 10,954,925 B2
(45) Date of Patent: Mar. 23, 2021

(54) BISTABLE ACTUATOR DEVICE HAVING A SHAPE MEMORY ELEMENT

(71) Applicants: UNIVERSITY OF SAARLAND, Saarbrücken (DE); ZEMA, CENTER FOR MECHATRONICS AND AUTOMATION TECHNOLOGY, Saarbrücken (DE)

(72) Inventors: Paul Motzki, Saarbrücken (DE); Stefan Seelecke, Saarbrücken (DE)

(73) Assignees: UNIVERSITY OF SAARLAND; ZEMA, CENTER FOR MECHATRONICS AND AUTOMATION TECHNOLOGY

( * ) Notice: Subject to any disclaimer, the term of this patent is extended or adjusted under 35 U.S.C. 154(b) by 170 days.

(21) Appl. No.: 16/300,180

(22) PCT Filed: May 10, 2017

(86) PCT No.: PCT/EP2017/061157
§ 371 (c)(1),
(2) Date: Mar. 22, 2019

(87) PCT Pub. No.: WO2017/194591
PCT Pub. Date: Nov. 16, 2017

(65) Prior Publication Data
US 2019/0203701 A1 Jul. 4, 2019

(30) Foreign Application Priority Data
May 10, 2016 (DE) .................. 10 2016 108 627.4

(51) Int. Cl.
G05G 1/02 (2006.01)
F03G 7/06 (2006.01)
G05G 5/06 (2006.01)

(52) U.S. Cl.
CPC ............... *F03G 7/065* (2013.01); *G05G 1/02* (2013.01); *G05G 5/06* (2013.01)

(58) Field of Classification Search
CPC ............. F03G 7/065; G05G 1/02; G05G 5/06
See application file for complete search history.

(56) References Cited

U.S. PATENT DOCUMENTS 4,544,988 A 10/1985 Hochstein
4,965,545 A * 10/1990 Johnson .................. F03G 7/065
337/140

(Continued)

FOREIGN PATENT DOCUMENTS

DE 10 2012 217 246 A1 4/2013
FR 2973578 A1 10/2012
JP 2014-026749 A 2/2014

*Primary Examiner* — Matthew T Largi
(74) *Attorney, Agent, or Firm* — Blueshift IP, LLC; Robert Plotkin (57) ABSTRACT

The invention relates to a bistable actuator device (1) for providing at least two actuator positions comprising:
an elastic bending element (2) supported at at least one attachment point (31, 32, 34) such that, by applying a switching torque at the attachment point (31, 32, 34), elastic deformation of the bending element (2) results in a change from a first actuator position to a second actuator position; and
at least one actuator element (41, 42) formed with a shape memory wire, the shape memory wire causing a pulling force by heating and being coupled to a portion of the bending element (2) at the attachment point (31, 32, 34) so that the pulling force causes the switching torque at the attachment point (31, 32, 34) to move the bending element (2) from the first actuator position to the second actuator position.

12 Claims, 8 Drawing Sheets

(56) References Cited

U.S. PATENT DOCUMENTS

| | | | |
|---|---|---|---|
| 5,618,269 A | 4/1997 | Jacobsen | |
| 5,977,858 A | 11/1999 | Morgen | |
| 6,133,816 A | 10/2000 | Barnes | |
| 6,220,550 B1 * | 4/2001 | McKillip, Jr. | B64C 27/001 244/215 |
| 6,917,276 B1 * | 7/2005 | Menard | F03G 7/065 337/14 |
| 2001/0010348 A1 | 8/2001 | Bilanin | |
| 2006/0038643 A1 * | 2/2006 | Xu | F03G 7/065 335/78 |
| 2006/0201149 A1 | 9/2006 | Biggs | |
| 2013/0081389 A1 * | 4/2013 | Browne | E05B 47/0009 60/527 |
| 2013/0081933 A1 * | 4/2013 | Browne | G05G 1/02 200/402 |
| 2014/0292473 A1 * | 10/2014 | Gaj | B30B 1/00 337/126 |
| 2018/0138833 A1 * | 5/2018 | van den Ende | H01L 41/053 |

\* cited by examiner

BISTABLE ACTUATOR DEVICE HAVING A SHAPE MEMORY ELEMENT

TECHNICAL FIELD

The invention relates to actuator devices, in particular an actuator device with a bistable element which can be brought into a changed bistable state with respect to its shape, orientation and/or position by deformation of an actuator element made of a shape memory material.

TECHNICAL BACKGROUND

Shape memory materials are already used in many ways for actuator devices. In particular, many actuator devices use a force resulting from the length reduction of a previously stretched wire made of shape memory material (shape memory wire) when exposed to heat. For such wires, however, there must always be a restoring force in order to stretch the wire, which has been shortened by thermal activation, back to its previous length. This is often done by a spring force, by the force of an activated additional shape memory wire or by a weight force of a mass.

In particular in actuator devices with a shape memory wire as actuator element and with a return spring, a certain position of the actuator device can only be held by the actuator element as long as a corresponding activation temperature of the shape memory wire is maintained. This is usually done by electrically energizing the shape memory wire. If the actuator device is to be held in this position for a longer period of time, this can be very energy-intensive as the higher temperature of the shape memory wire needs to be maintained.

With such an actuator device, the restoring force of the return spring acts permanently on the shape memory wire; this can lead to critical stresses and accelerated aging of the shape memory wire due to the permanent load. Furthermore, a large construction space is required to achieve appreciable deflections by the shape memory wire, as the achievable deflection depends on the length of the shape memory wire.

In order to avoid these disadvantages, an actuator device can be provided which can assume bistable actuator positions without a permanent load being exerted on an actuator element in one of the actuator positions. The publication DE 10 2012 217 246 A1 provides for a bistable device in which an elastically deformable plate is arranged between fastening elements. The plate is deformable into one of two stable deformed positions by exerting a compressive force, whereby the compressive force can be exerted by means of a shape memory alloy or piezo actuator element.

An actuator with a housing in which a leaf spring is arranged is known from the U.S. Pat. No. 5,977,858 publication. The leaf spring is connected to two shape memory wires which, when activated, move the leaf spring to a first position or to a second position.

It is an object of the present invention to provide an actuator device in which a bending element can be bistably deformed into at least two actuator positions, whereby the actuator elements made of shape memory materials are not subject to any permanent load in the non-activated state. Furthermore, a switching of the actuator element is to be achieved already with small actuator deflections.

DESCRIPTIONS OF EMBODIMENTS

This object has been achieved by the actuator device according to claim 1 and the method for operating an actuator device according to the further independent claim.

Further embodiments are specified in the dependent claims.

According to a first aspect, an actuator device is provided at least two actuator positions; comprehensive:

a bistable elastic bending element held at at least one attachment point such that, by applying a switching torque at the attachment point, elastic deformation of the bending element results in a change from a first actuator position to a second actuator position each representing a bistable position of the bending element;

at least one actuator element formed with a shape memory wire, wherein the shape memory wire causes a pulling force by heating and is coupled to a portion of the bending element at the attachment point such that the pulling force causes the switching torque at the attachment point to move the bending element from the first actuator position to the second actuator position.

In particular, a further actuator element may be coupled to a portion of the bending element at the attachment point such that the pulling force causes a switching torque at the or a further attachment point to move the bending element from the second actuator position to the first actuator position.

One idea of the above actuator device is to provide a bistable elastic bending element, which is held at at least one section pivotably on at least one pivot axis and can exert a bending stress by its own deformation. The bending element is arranged with respect to the pivot axis in such a way that it resists a restoring bending stress in a first or a different second actuator position, each of which represents a bistable position of the bending element. To move the bending element from the first actuator position to the second actuator position or vice versa, a switching torque is applied to the bending element at the pivot axis in a first direction or in a second direction. The switching torques are effected by one or more actuator elements each formed with a shape memory wire, their lengths being shortened with corresponding activation and which can thereby exert a pulling force. In the non-activated state, the one or more actuator elements can be stretched by exerting a lengthening force.

Such an actuator device has the advantage that it can be used to provide bistable/multistable actuator positions that can only be achieved by exerting pulling forces. The pulling forces can be easily provided by shape memory wires. In particular, such an actuator device can be realized without restoring spring forces or weight forces.

Furthermore, the elastic bending element may be formed of an elastic metallic material, the bending element being arranged between the first attachment point and a second attachment point with a length which is greater than the distance between the first attachment point and the second attachment point.

According to an embodiment, the bending element can be pivotably mounted at at least one of several attachment points, whereby several pull points are provided on the bending element, at each of which one or more actuator elements engage in order to effect the pulling force.

In particular, two pull points can be arranged at at least one of the several attachment points at portions of the bending element opposite to the respective attachment point, so that by exerting a tension force by one of the actuator elements a first switching torque is exerted on the bending element at the respective attachment point and by exerting a tension force by another of the actuator elements a second switching torque opposite to the first switching torque is exerted on the bending element at the respective attachment point.

Furthermore, a common pull point can be arranged at at least one of the several attachment points, from which several actuator elements extend in different, in particular opposite, directions, so that a first switching torque is exerted on the bending element at the respective attachment point by exerting a pulling force through one of the actuator elements, and a second switching torque, opposite to the first switching torque, is exerted on the bending element at the respective attachment point by exerting a pulling force through a further one of the actuator elements.

The pull points are attached to opposite portions of the bending element with respect to the attachment of the bending element, in order to exert a pulling force in the same transverse direction with respect to the bending element upon alternating activation, whereby the bending element is brought into the first or second actuator position.

This allows the actuator elements to be located at pull points on the bending element, eliminating the need for additional components to convert pulling forces into switching torques. In particular, it can be achieved simultaneously that the pulling forces of the actuator elements are exerted in the same direction for switching between the actuator positions. This enables a space-saving design of the actuator device, whereby the two actuator elements can be arranged essentially parallel to each other.

Furthermore, the pull points can each be arranged at a distance on the bending element between 0.5 and 25%, preferably between 1% and 20%, more preferably between 2% and 5% of the length of the bending element between the attachment points. The distance of the pull points from an associated attachment point can be selected such that the stroke of an actuator, which is achieved by the adjustment between the actuator positions, is greater by a factor of at least 5, preferably at least 10, than the stroke which is required at the pull point for changing between the actuator positions.

By arranging the pull points relatively close to the attachment point at which the bending element is pivotally mounted, a high switching torque for bistable deformation of the bending element can be triggered by a small actuator stroke, so that it is possible to use relatively short shape memory wires with a small stroke as the actuator element. This also allows such an actuator device to be as compact as possible, since the length of the shape memory wire can be considerably reduced compared to known shape memory actuators.

It can be provided that the actuator elements extend transversely or perpendicularly, i.e. obliquely or at right angles to the connecting section between the attachment points, so that a force component is exerted on the bending element at right angles to the connecting section between the attachment points, and are held at their ends opposite the pull points on a stationary component, e.g. a housing or the like.

The bending element can be mounted at at least one of several attachment points so as to be pivotable about an axis of rotation, e.g. on a shaft or an axis, wherein at the one attachment point at least one actuator element in particular is mounted at a shaft or axis, in particular transversely or vertically, i.e. the actuator element engages at an angle or at right angles to the axis of rotation, so that a force component acts at right angles to the axial direction by exerting a pulling force on the axis of rotation, and the switching torque is exerted about the axis of rotation at the respective attachment point by one of the actuator elements.

In particular, the at least one pulling leg can extend substantially transversely or perpendicularly, i.e. obliquely or perpendicularly to the bending element, and the at least one actuator element can extend obliquely or substantially parallel to a connecting section between two of the several attachment points.

It may be provided that the bending element is pivotably mounted at at least one of a plurality of attachment points, wherein a common pull point is provided at the at least one attachment point at the bending element, wherein a plurality of actuator elements engage at the common pull point, wherein the common pull point is thus arranged at the at least one attachment point of the bending element, so that by exerting a pulling force through one of the plurality of actuator elements a first switching torque is exerted on the bending element at the at least one attachment point and by exerting a pulling force through a further one of the plurality of actuator elements a second switching torque opposite to the first switching torque is exerted on the bending element at the at least one attachment point.

Furthermore, the bending element can be pivotably mounted at four attachment points about a respective axis of rotation, e.g. on a respective shaft or on a respective axis, wherein at least one of the actuator elements is mounted between two pull points on pulling legs of different attachment points which are adjacent in the circumferential direction of the planar extent of the bending element, so that, by the application of a pulling force by the at least one actuator element, switching torques which are directed in opposite directions to one another, are exerted at the attachment points which are interconnected by the at least one actuator element about the axis of rotation.

It may be provided that at least one of the actuator elements configured as a shape memory wire connects the pull points along the circumferential direction of the bending element.

According to a further embodiment, the bending element can be pivotably mounted at at least one of a plurality of attachment points, wherein a common pull point is provided at the at least one attachment point of the bending element, wherein a plurality of actuator elements engage at the common pull point, wherein the common pull point is arranged at the at least one attachment point of the bending element, so that by applying a pulling force by one of the plurality of actuator elements a first switching torque is exerted on the bending element at the at least one attachment point and by exerting a pulling force through a further one of the plurality of actuator elements a second switching torque opposite to the first switching torque is exerted on the bending element at the at least one attachment point.

Furthermore, the at least two actuator elements can be configured as antagonist-protagonist arrangement in such a way that when a pulling force is exerted by one of the actuator elements, the respective other actuator element is stretched.

According to an embodiment, at least one actuator element can be connected to an electrical power source to achieve heating by electrical energizing.

According to a further aspect, a method for operating the above actuator device with at least two actuator elements can be provided, wherein the shape memory wire of the actuator element is alternately heated to exert the switching torque in order to effect, by the pulling force, the switching torque around the first attachment point for changing the actuator position.

BRIEF DESCRIPTION OF THE DRAWINGS

Embodiments are described in more detail in conjunction with the accompanying drawings in which.

DESCRIPTION OF EMBODIMENTS

Figure 1A:
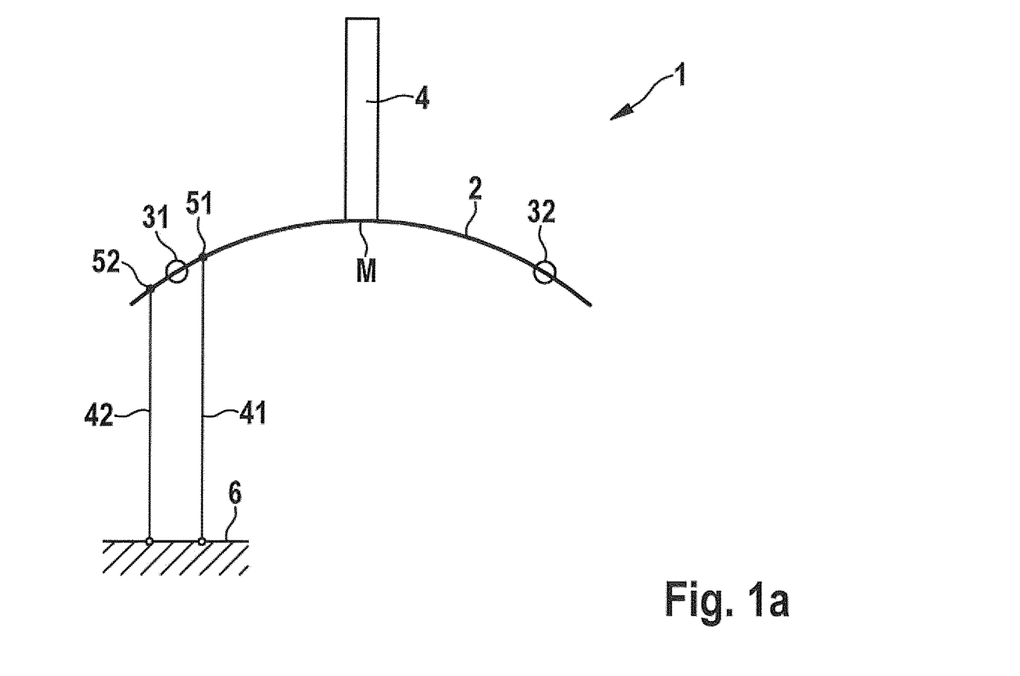
FIGS. 1a and 1b show a schematic representation of an actuator device in a first actuator position and a second actuator position.
Figure 1B:
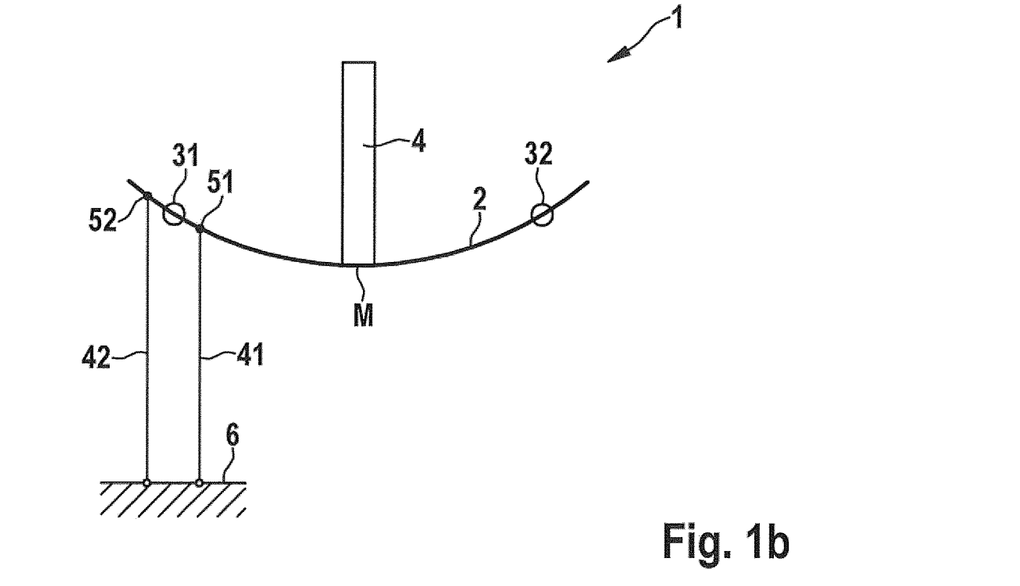

FIGS. 1a and 1b show an actuator device in two actuator positions. The actuator positions represent bistable positions of the actuator device which are maintained without supply of energy.

Actuator device 1 has a flat bending element 2, which can be in the form of a small bending plate or a bending tongue made of an elastic material. The bending element 2 may in particular be made of a metallic material having a high elasticity and a high dimensional stiffness. In the shown embodiment, the bending element 2 is clamped between a first and a second attachment point 31, 32 so that the length of the bending element 2 or section of the bending element 2 which is between the attachment points 31, 32, is higher than the distance between the attachment points 31, 32.

In the shown embodiment, the bending element 2 can be pivotably mounted at both attachment points 31, 32, so that due to the higher length of the bending element 2 between the attachment points 3, a deformation of the bending element 2 results in a first actuator position (FIG. 1a) or in a second actuator position (FIG. 1b). The bending element 2 thus serves as a switching element which can be brought into a first actuator position in a first form/deformation and into a second actuator position in a second form/deformation in order to, for example, move an actuating element 4 coupled to the bending element 2 from a first to a second position or vice versa.

The switching of the bending element 2 takes place by exerting a switching torque near the first attachment point 31. The switching torque can be exerted according to the embodiment of FIGS. 1a and 1b, in that a first actuator element 41 is fastened to the bending element 2 at a first pull point 51 and in that a second actuator element 42 is fastened to the bending element 2 at a second pull point 52. The first and second actuator elements 41, 42 are fixed at their ends opposite the pull points 51, 52 to a fixed component 6.

The first and second pull points 51, 52 are arranged next to each other with respect to the first attachment point 31 at opposite sections of the bending element 2. In the shown embodiment, approximately the centre M of the bending element 2 between the two attachment points 31, 32 experiences the highest deflection, and it is provided that the first pull point 51 is arranged between the centre of the bending element 2 and the first attachment point 31, with a distance from the first attachment point 31 which is preferably a maximum of 25%, preferably between 1 and 20%, particularly preferably between 2 and 5% of the distance between the two attachment points 31, 32. In this way, a small deflection at the first pull point 51 transverse to the connecting section between the attachment points 31, 32 is sufficient to cause a deformation of the bending element 2 in the direction of the respective other actuator position.

The distance of the pull points 51, 52 from the attachment point 31 can be selected such that the stroke of an actuating element 4, which is achieved by the adjustment between the actuator positions, is larger by a factor of at least 5, preferably by at least 10, than the stroke required at the pull point 51, 52 for switching between the actuator positions.

The actuator elements 41, 42 are configured as shape memory wires made of a shape memory material, such as a shape memory alloy, which are known from the state of the art. Shape memory wires can be elastically extended by stretching and will return to their shorter initial state when heated. The respective actuator element 41, 42 can be heated by external heat sources or by a current flow through the shape memory wire that heats the actuator element 41, 42.

If the first actuator element 41 is activated, i.e. heated, starting from the actuator position in FIG. 1a, its length is reduced and a pulling force is exerted on the first pull point 51. As soon as the pull point 51 is sufficiently deflected transverse to the connecting section between the attachment points 31, 32, the bending element 2 deforms/jumps into the second actuator position shown in FIG. 1b. Thus, the new positions of the pull points 51, 52 which are then reached quickly relieve the first actuator element 41 and simultaneously stretch the second actuator element 42, since the second pull point 52 opposite the first attachment point 31 moves transversely to the connecting section between the attachment points 31, 32 in the opposite direction.

In this way, the second actuator element 42 can be brought into a stretched state in which it is deformed and, when activated, i.e. heated, can shorten its length due to its shape memory property. When the second actuator element 42 is activated, a pulling force is applied to the second pull point 52 in substantially the same direction as previously applied to the first pull point 51. This causes a switching torque opposite to the previous situation around the first attachment point 31, by which the bending element 2 can be brought back from the second actuator position (FIG. 1b) to the first actuator position (FIG. 1a).

In this example, the pull points 51, 52 are attached to the bending element 2 in order to apply a switching torque to the bending element 2 at the first attachment point 31.

Figure 2:
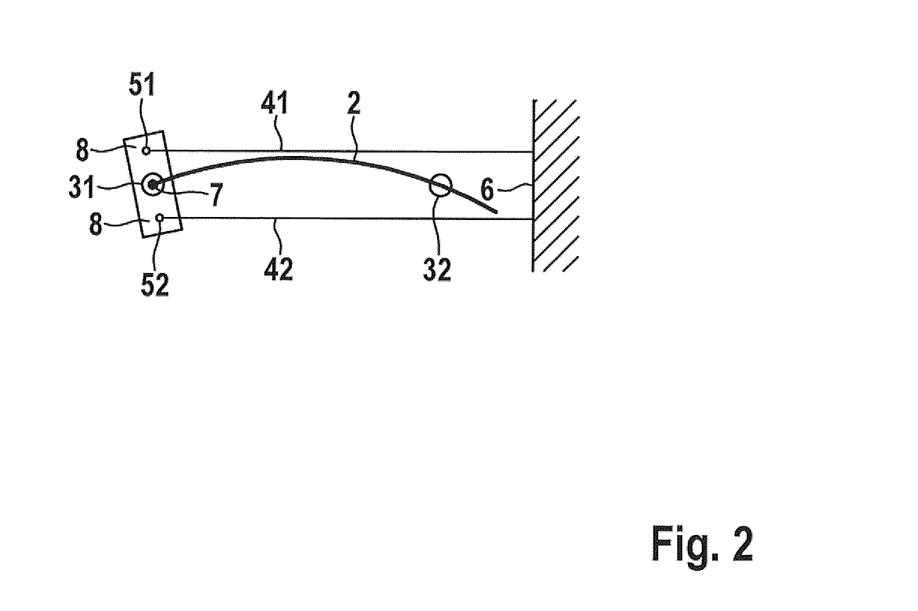
FIG. 2 shows a schematic representation of an actuator device in a further embodiment.

Alternatively, as shown in FIG. 2, the bending element 2 may be provided with a rotatable shaft 7 at the first attachment point 31, forming a pivot axis. Alternatively, the rotation axis can also be formed by the bending element itself, which is clamped or supported accordingly. Furthermore, the shaft 7 can be provided with, for example, axially offset pulling legs 8 projecting in different directions with respect to the shaft 7, in particular with opposite pulling legs 8, at which the pull points 51, 52 for the actuator elements 41, 42 are arranged. By exerting a pulling force via the pull points 51, 52 via the actuator elements 41, 42, a corresponding switching torque can be exerted on the shaft 7.

A switching torque exerted on the shaft 7 by the actuator elements 41, 42 can then serve to deform the bending element 2 between the first and second actuator position. This allows arranging the actuator elements 41, 42, which are configured as shape memory wires, extending along different directions, so that a space-saving assembly can also be realized. In particular, the embodiment of FIG. 2 shows an arrangement of the shape memory wires parallel to the connecting section between the first and second attachment points 31, 32, wherein the actuator elements 41, 42 can act on the shaft 7 arranged at the first attachment point 31 via corresponding pulling legs 8 projecting transversely or perpendicularly, i.e. obliquely or at right angles to the direction of the connecting section between the two attachment points 31, 32, respectively. This enables a particularly space-saving configuration of the actuator device 1.

Figure 3A:
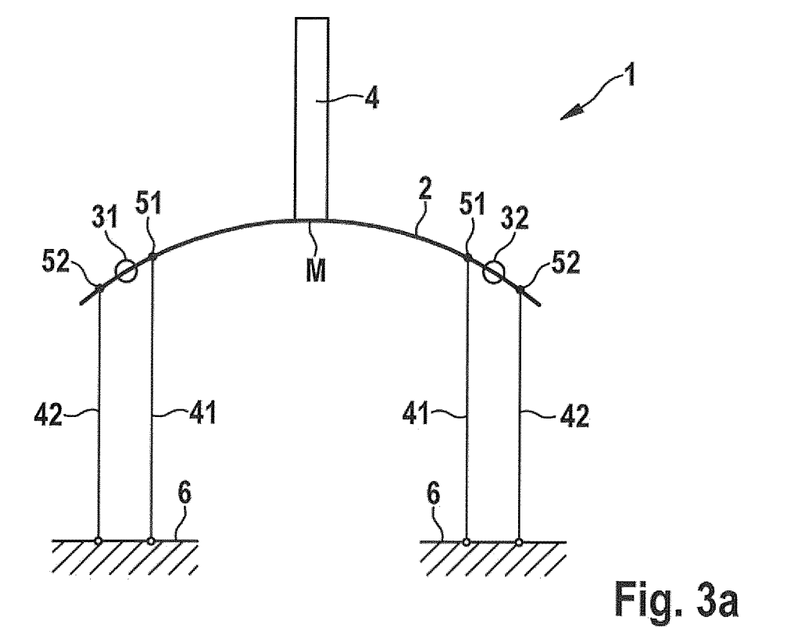
FIGS. 3a and 3b show another actuator device in a first actuator position and a second actuator position.
Figure 3B:
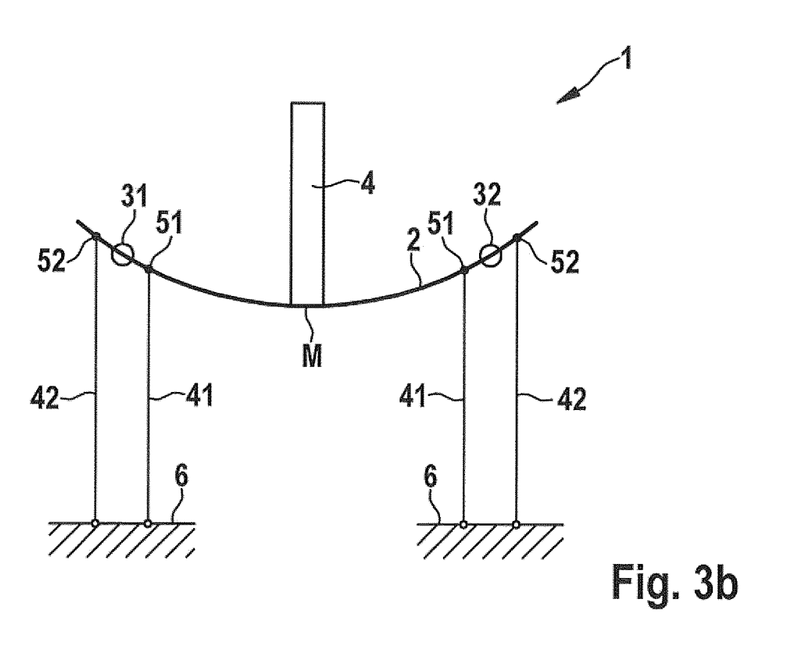

As shown in FIGS. 3a and 3b, the actuator device as shown in FIG. 1 can also be activated via both attachment points 31, 32 with respective switching torques directed against each other in order to reduce the switching torque required at one of the attachment points 31, 32. This allows to further reduce the distance between the pull points 51, 52 and the respective attachment points 31, 32 in order to further reduce the required actuator stroke, i.e. the length between the stretched state and the initial state of the actuator elements 41, 42 reached after activation.

Figure 4A:
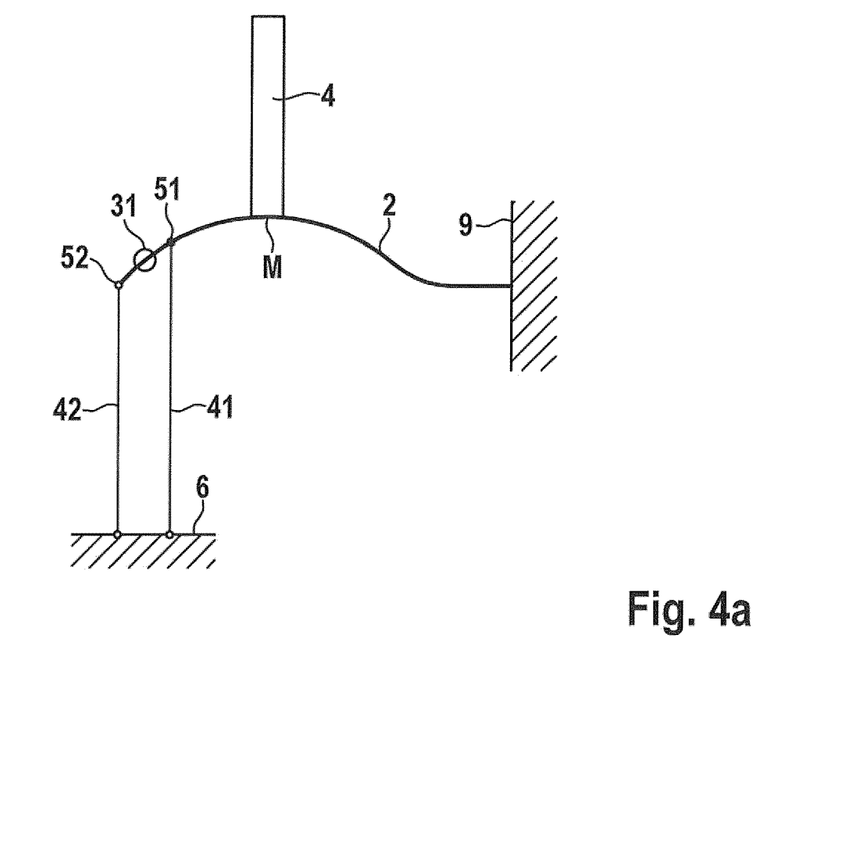
FIGS. 4a and 4b show another actuator device in a first actuator position and a second actuator position.
Figure 4B:
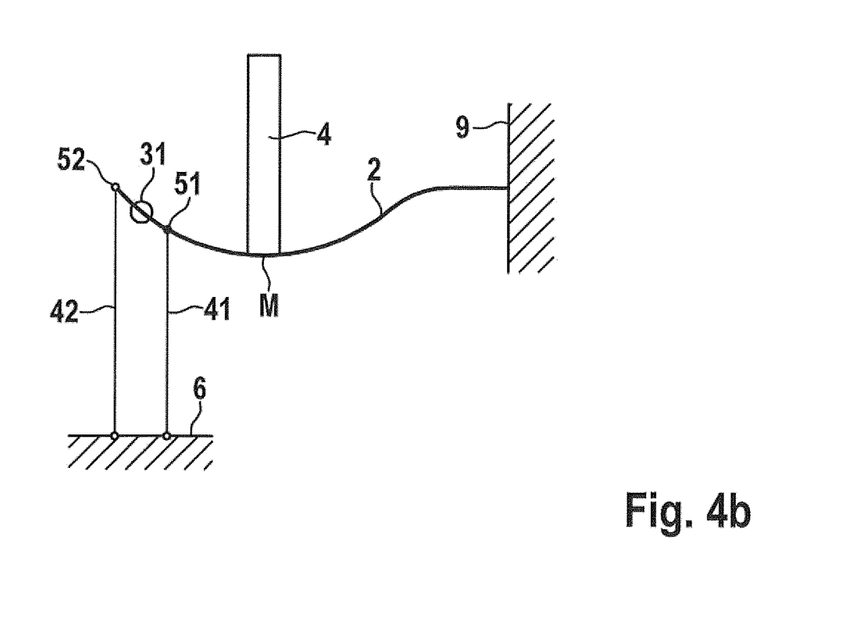

FIGS. 4a and 4b show another embodiment of actuator device 1. Here one end of the bending element 2 is attached to a holding device 9, i.e. the attachment of the respective end exerts a corresponding holding torque on the bending element 2. Thus, to cause a deformation of the bending element 2, a switching torque only has to be exerted on the first attachment point 31. In this way, especially in connection with the embodiment of FIG. 2, the bending element 2 and the ends of the actuator elements 41, 42, which are opposite the pull points 51, 52 arranged on the pulling legs 8, can be fastened to a common holding device, so that a structurally simple configuration of the actuator device 1 can be achieved.

Figure 5A:
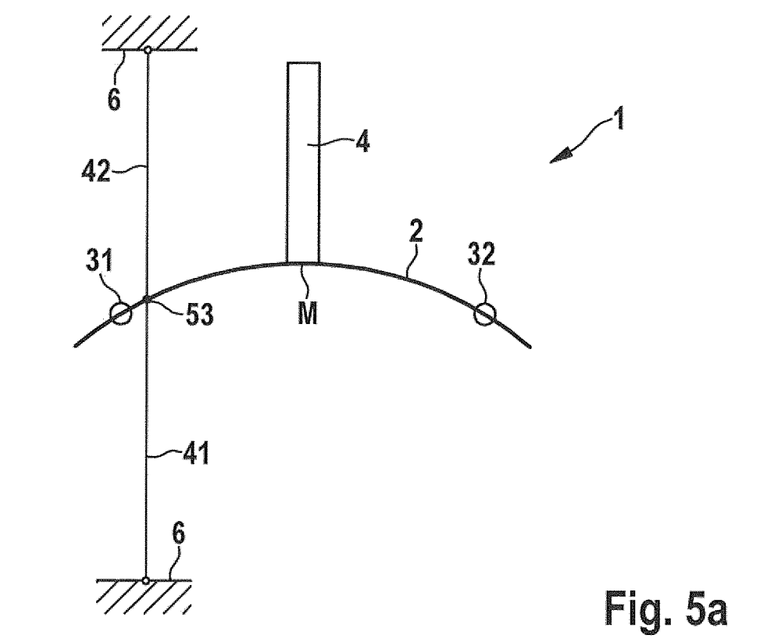
FIGS. 5a and 5b show another actuator device in a first actuator position and a second actuator position.
Figure 5B:
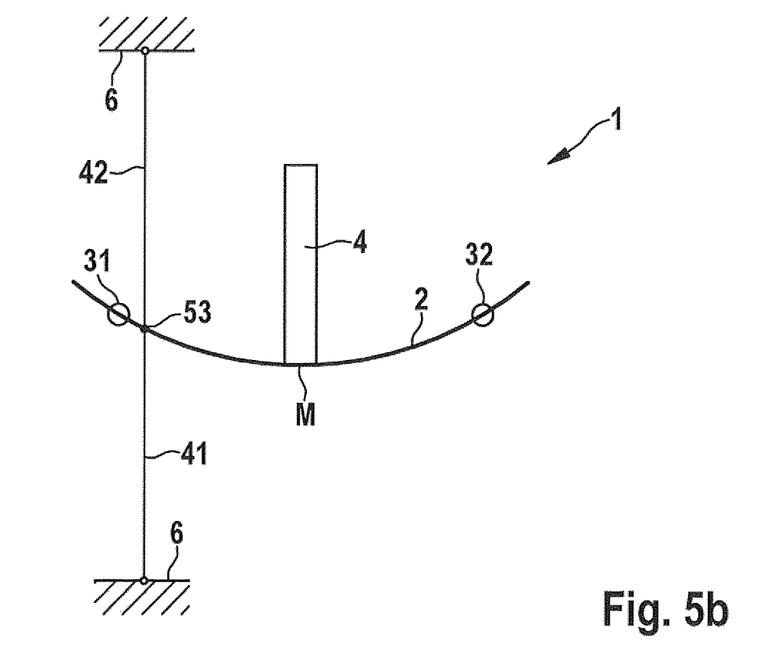

FIGS. 5a and 5b show another actuator device 1 in two actuator positions. In contrast to the embodiment of FIGS. 1a and 1b, the two actuator elements 41, 42 are arranged at a common pull point 53. For example, the actuator elements 41, 42 can extend in opposite directions starting from the common pull point 53 on the bending element 2. The common pull point 53 can be arranged as shown on the bending element 2 between the attachment points 31, 32. Alternatively, the common pull point 53 may also be located on the bending element 2 at a section of the bending element 2 projecting from the attachment point 31, 32 away from the section between the attachment points 31, 32.

As described above, the switching of the bending element 2 is effected by a switching torque, which is caused by exerting a pulling force near the first attachment point 31. The switching torque can be applied according to the embodiment of FIGS. 5a and 5b by attaching the first actuator element 41 to the common pull point 53 on the bending element 2 and the second actuator element 42 also to the common pull point 53 on the bending element 2. The first and second actuator elements 41, 42 are fixed at their ends opposite the common pull point 53 to e.g. stationary components 6. The actuator elements 41, 42 can exert pulling forces on the pull point in different directions when activated, preferably in opposite directions.

The common pull point 53 may be offset with respect to the first attachment point 31 in the direction of the second attachment point 32 or in an opposite direction. Apart from the different arrangement of the first and second actuator elements 41, 42, the actuator device 1 of FIGS. 5a and 5b may be provided with the features of the embodiments of FIGS. 1 to 4.

Figure 6A:
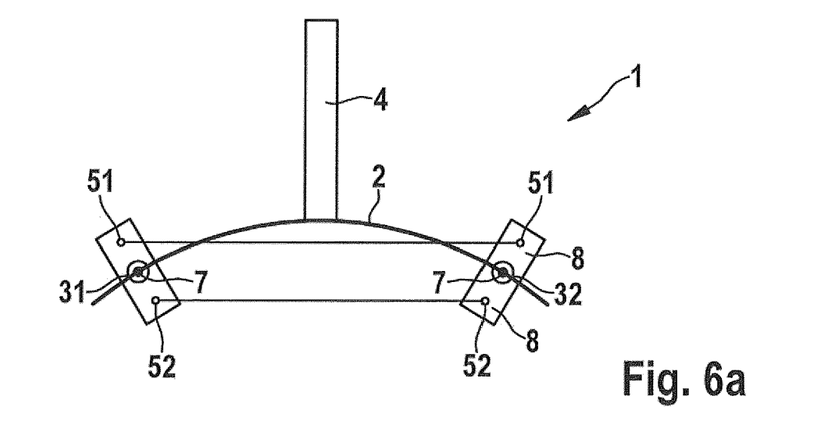
FIGS. 6a and 6b show another actuator device in a first actuator position and a second actuator position.
Figure 6B:
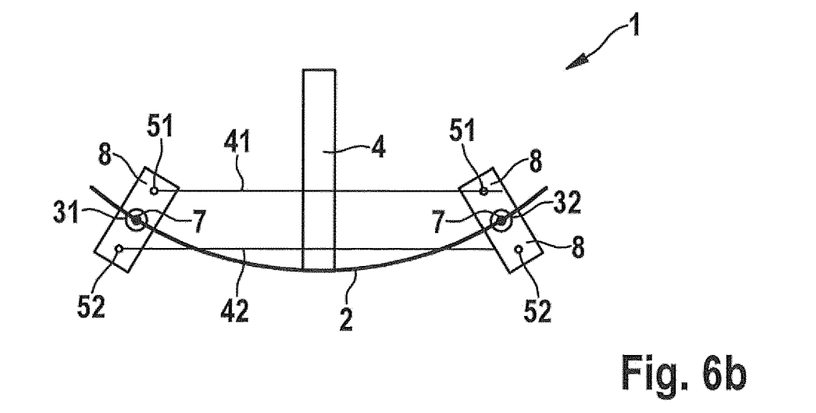

FIGS. 6a and 6b show a further embodiment of an actuator device 1 in two different actuator positions, in which the bending element 2 is arranged at the first and second attachment points 31, 32 in the manner described above and is respectively held pivotably about a corresponding axis of rotation by a shaft 7. The two shafts 7 at the attachment points 31, 32 can, for example, be axially offset and provided with pulling legs 8 opposite to each other with respect to the respective shaft 7 (which alternatively can also project from the respective shaft 7 in different directions), wherein the pulling legs 8 project radially from the pivot axis. The pull points 51, 52 for the actuator elements 41, 42 can be arranged at the pulling legs 8 offset to the pivot axis. By exerting a pulling force on the pull points 51, 52 via the actuator elements 41, 42, a corresponding switching torque can be exerted on both shafts 7. In the present example, two actuator elements 41, 42 are provided so that the first actuator element 41 is arranged between the two first pull points 51 at the pulling legs 8 of the two attachment points 31, 32 and the second actuator element 42 is arranged between the two second pull points 52 at the pulling legs 8 of the two attachment points 31, 32. In this way, when the first or the second actuator element 41, 42 are activated, opposing switching torques can be exerted on the bending element 2 at the attachment points 31, 32. It is not necessary to attach the ends of the actuator elements 41, 42 opposing the pull points, to stationary components.

In this example, the pull points 51, 52 are attached to bending element 2 in order to apply a switching torque to bending element 2 at the first attachment point 31. Alternatively, the bending element 2 can be firmly connected to a shaft 7 as the pivot axis at the first attachment point 31. In addition, as shown in FIG. 2, the shaft 7 can be provided with opposite pulling legs 8, e.g. axially offset with respect to the shaft 7 (alternatively, they can also project from the shaft 7 in different directions), wherein the pull points 51, 52 for the actuator elements 41, 42 are arranged at the pulling legs. By exerting a pulling force via the pull points 51, 52 via the actuator elements 41, 42, a corresponding switching torque can be exerted around the axis of rotation.

Figure 7:
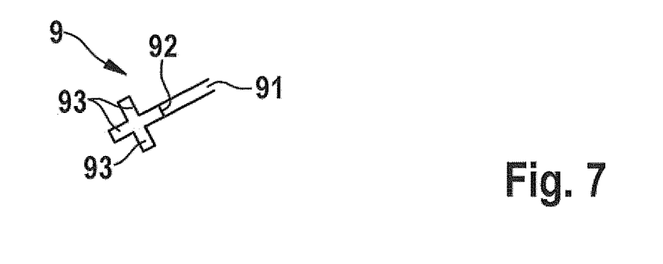
FIG. 7 show a schematic representation of a bearing element.

FIG. 7 shows a representation of a bearing element 9 for supporting the bending element 2 at one or more of the attachment points 31, 32, i.e. e.g. the first and/or the second attachment point 31, 32. The bearing element 9 has a receiving opening 91 or other mounting for receiving/fixing one end of the bending element 2 and is provided with a bearing 92 to hold the bearing element 9 pivotally at the respective attachment point 31, 32. The bearing 92 can have the shaft 7 as axis of rotation. A non-elastic transmission element 93 is connected to the bearing 92 with an offset, preferably opposite the receiving opening 91, in order to provide one or more pull points for attaching the actuator elements 41, 42. The transmission element 93 can be in the form of a draw leg. The transmission element 93 is used to generate the switching torque in the area of the respective attachment point, wherein the switching torque can be transferred to the bending element 2 via the mounting opening 91/other holding means.

Figure 8A:
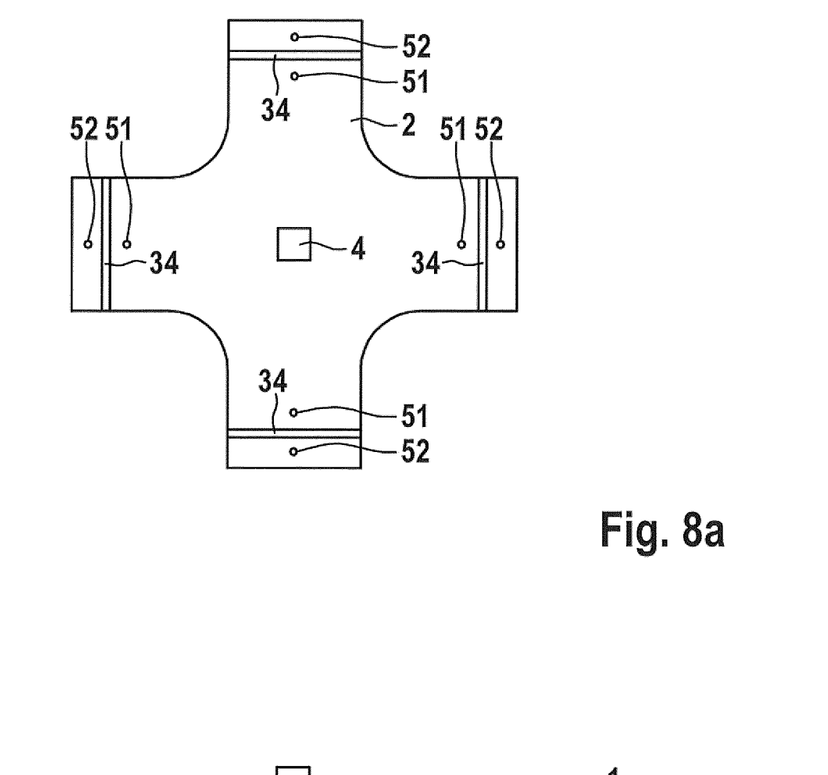
FIGS. 8a and 8b show a further actuator device in a plan view and a cross-sectional view.
Figure 8B:
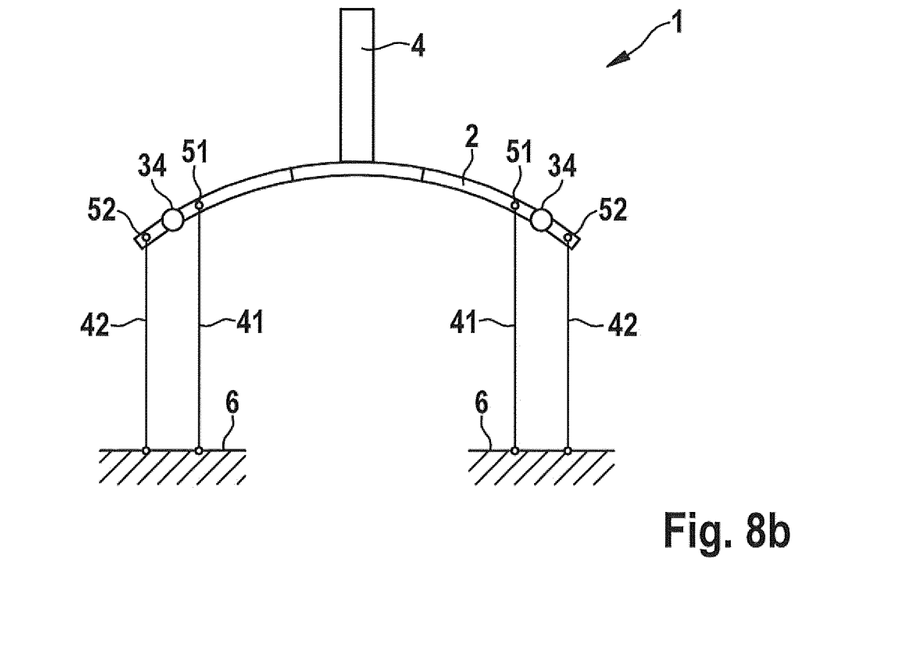

FIGS. 8a and 8b show a further version of actuator device 1 in a plan view and a side view. Actuator device 1 according to the embodiment of FIGS. 8a and 8b has a bending element 2 which has more than two attachment points 34. In this embodiment, the bending element 2 is mounted crosswise and pivotable at four attachment points 34 so that two actuator positions result, a first actuator position in which the centre of the bending element 2 is transverse or perpendicular to the plane of the attachment points upwards, and a second actuator position in which the centre of the bending element 2 is transverse or perpendicular to the plane of the attachment points 34 downwards. Similarly, one or more actuator elements (not shown) may be arranged in one of the ways described above at one, more or all of the attachment points 34 to exert a switching torque on the bending element 2.

Figure 9A:
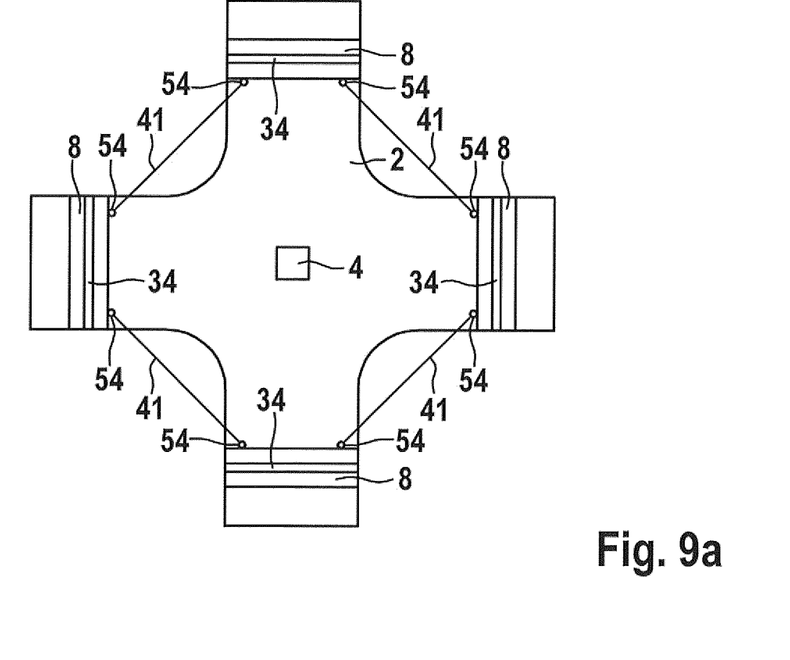
FIGS. 9a and 9b show another actuator device in a plan view and a cross-sectional view.
Figure 9B:
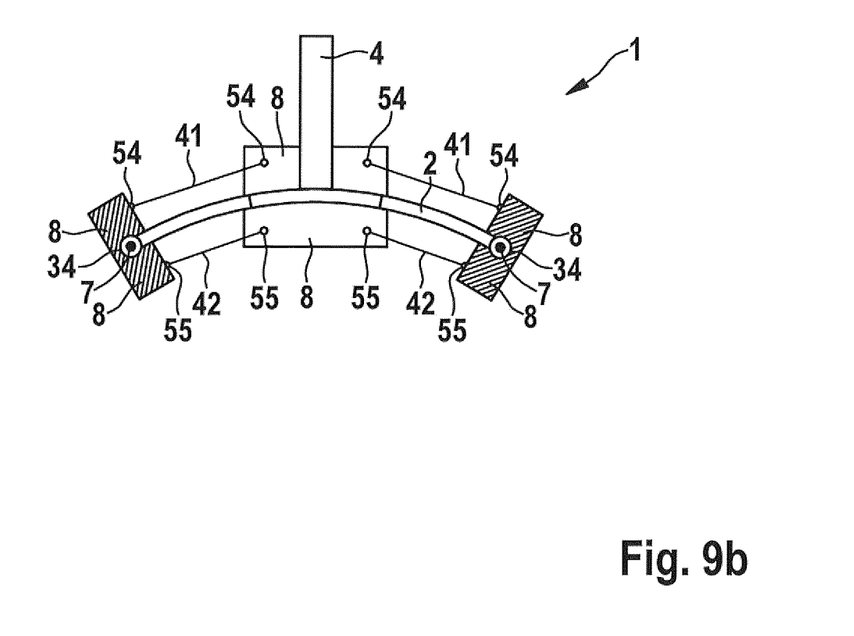

FIGS. 9*a* and 9*b* show a variant of actuator device 1 of FIGS. 8*a* and 8*b* in a plan view and a side view. As described above, the bending element 2 is clamped between four attachment points 34 and mounted there as a pivot axis via the respective shafts 7. Transversely or vertically, i.e. obliquely or at right angles to the extension direction of the bending element 2 at each attachment point 34, two pulling legs 8 at each attachment point 34 project in different, in particular opposite directions.

The actuator elements 41, 42 are mounted between pull points on the pulling legs 8, where the pull points 54, 55 represent a distance to the pivot axes formed by the shafts 7. In particular, as shown in FIGS. 9*a* and 9*b*, each of the actuator elements 41, 42 can be arranged between two pull points 54, 55 which are offset in the same direction as the shaft 7. Furthermore, the pull points 54, 55 can be located on pulling legs 8, which are arranged circumferentially on adjacent attachment points 34. In this way, two actuator elements engage on each leg 8 of an attachment point 34, which can engage on the same or on two different pull points (offset in the direction of the pivot axis of the respective assigned shaft 7).

Instead of the shafts 7, the described embodiments can also be provided with correspondingly supported axes.

According to a further embodiment, the actuator elements 41, 42 can also be configured as a one-piece or multi-piece circumferential shape memory wire, which connects the pull points 54 or 55 along the circumferential direction of the bending element 2. In order to achieve a uniform tension distribution, the shape memory wire can be arranged in a displaceable manner at at least some of the respective pull points 54, 55.

The invention claimed is:

1. A bistable actuator device for providing at least two actuator positions comprising:
   an elastic bending element supported at at least one attachment point such that, by applying at least one switching torque at the at least one attachment point, elastic deformation of the bending element results in a change from a first actuator position to a second actuator position; and
   at least one actuator element formed with a shape memory wire, the shape memory wire causing a pulling force by heating and being coupled to a portion of the bending element at the at least one attachment point so that the pulling force causes the at least one switching torque at the at least one attachment point to move the bending element from the first actuator position to the second actuator position,
   wherein the elastic bending element is formed of an elastic metallic material, wherein the bending element is disposed between a first of the at least one attachment point and a second of the at least one attachment point with a length larger than the distance between the first attachment point and the second attachment point,
   wherein the bending element is pivotably mounted at a plurality of the at least one attachment point, wherein a plurality of pull points are provided at the bending element, at each of which the at least one actuator element engage in order to effect the respective pulling force,
   wherein two of the plurality of pull points are arranged at the plurality of the at least one attachment point at portions of the bending element opposite with respect to the respective at least one attachment point, so that a first of the at least one switching torque is applied on the bending element at the respective at least one attachment point by exerting the respective pulling force by one of the at least one actuator elements, and a second of the at least one switching torque opposite to the first switching torque is applied on the bending element at the respective at least one attachment point by exerting the respective pulling force by a further one of the at least one actuator elements.

2. The actuator device according to claim 1, wherein a further actuator element is coupled to a portion of the bending element at the at least one attachment point that the pulling force causes the at least one switching torque at the at least one or at a further of the at least one attachment point to move the bending element from the second actuator position into the first actuator position.

3. The actuator device according to claim 1, wherein a common one of the plurality of pull points is arranged at a section of the bending element at at least one of the attachment points, wherein a plurality of the at least one actuator element extend in different directions at the common pull point, so that by exerting the respective pulling force by one of the actuator elements the first switching torque is applied on the bending element at the respective at least one attachment point and the second switching torque opposite to the first switching torque is applied on the bending element at the respective at least one attachment point by exerting the respective pulling force by a further one of the at least one actuator element.

4. The actuator device according to claim 1, wherein each of the plurality of the pull points are arranged at a distance on the bending element which corresponds to a maximum of 25% of the length of the bending element between the plurality of the at least one attachment point.

5. The actuator device according to claim 1, wherein the at least one actuator element extend transversely or perpendicularly to a connecting section between the plurality of the at least one attachment point and are supported at their ends opposite the pull points on a stationary component.

6. The actuator device according to claim 1, wherein two of the at least one actuator element are configured as antagonist-protagonist arrangement so that, when the pulling force is applied by one of the two actuator elements, the respective other actuator element is stretched.

7. The actuator device according to claim 1, wherein the at least one actuator element is connected to an electrical power source in order to achieve heating by electrical energization.

8. A bistable actuator device for providing at least two actuator positions comprising:
   an elastic bending element supported at at least one attachment point such that, by applying at least one switching torque at the at least one attachment point, elastic deformation of the bending element results in a change from a first actuator position to a second actuator position; and
   at least one actuator element formed with a shape memory wire, the shape memory wire causing a pulling force by heating and being coupled to a portion of the bending element at the at least one attachment point so that the pulling force causes the at least one switching torque at the at least one attachment point to move the bending element from the first actuator position to the second actuator position,
   wherein the bending element is pivotably mounted about an axis of rotation, on a shaft, at a plurality of the at least one attachment point wherein at the at least one attachment point at least one of the at least one actuator element is mounted at a pulling leg arranged on the axis of rotation, and extending, transversely or perpendicularly from an axial direction of the rotation axis, of the shaft, so that, by exerting the respective pulling force by one of the at least one actuator elements, the at least one switching torque is applied at the relevant at least one attachment point about the rotation axis, wherein the at least one pulling leg extends transversely or perpendicularly to the bending element and/or the at least one actuator element extends in parallel to a connecting section between two of the plurality of the at least one attachment point.

9. The actuator device according to claim 8, wherein the bending element is pivotably mounted at at least two of the at least one attachment point about a rotation axis, about a respective shaft, wherein at each of the two of the at least one attachment point two pulling legs which project in different directions with respect to the rotation axis, and are particularly arranged opposite one another, are mounted, wherein the pulling legs project transversely or perpendicularly opposite one another in different directions, wherein the pulling legs each having pull points, wherein the at least one actuator element is arranged between two pull points on pulling legs of different of the at least two attachment points, so that by exerting the respective pulling force by the at least one actuator element, a plurality of the least one switching torque directed in opposite directions to one another are applied at the at least two attachment points about the respective rotation axis, on the respective shaft.

10. The actuator device according to claim 9, wherein the bending element is pivotably mounted at four of the at least one attachment point about a respective rotation axis, on a respective shaft, wherein the at least one actuator element is mounted between two pull points on pulling legs of different of the at least four attachment points adjacent in the circumferential direction of the planar extent of the bending element, so that, by exerting the pulling force by the at least one actuator element, a plurality of the at least one switching torques directed in opposite directions to one another are applied at the at least four attachment points interconnected by the at least one actuator element about the respective rotation axis, on the respective shaft.

11. The actuator device according to claim 10, wherein the at least one actuator element is configured as a shape memory wire interconnecting the pull points along the circumferential direction of the bending element.

12. A method for operating a bistable actuator device for providing at least two actuator positions, the method comprising supporting an elastic bending element at at least one attachment point such that, by applying at least one switching torque at the at least one attachment point, elastic deformation of the bending element results in a change from a first actuator position to a second actuator position; and, at at least one actuator element formed with a shape memory wire, causing the shape memory wire to cause a pulling force by heating and being coupled to a portion of the bending element at the at least one attachment point so that the pulling force causes the at least one switching torque at the at least one attachment point to move the bending element from the first actuator position to the second actuator position, wherein the elastic bending element is formed of an elastic metallic material, wherein the bending element is disposed between a first of the at least one attachment point and a second of the at least one attachment point with a length larger than the distance between the first attachment point and the second attachment point, wherein the bending element is pivotably mounted at a plurality of the at least one attachment point, wherein a plurality of pull points are provided at the bending element, at each of which the at least one actuator element engage in order to effect the respective pulling force, wherein two of the plurality of pull points are arranged at the plurality of the at least one attachment point at portions of the bending element opposite with respect to the respective at least one attachment point, so that a first of the at least one switching torque is applied on the bending element at the respective at least one attachment point by exerting the respective pulling force by one of the at least one actuator elements, and a second of the at least one switching torque opposite to the first switching torque is applied on the bending element at the respective at least one attachment point by exerting the respective pulling force by a further one of the at least one actuator elements.

\* \* \* \* \*